United States Patent
Peddu et al.

(10) Patent No.: US 6,931,428 B2
(45) Date of Patent: Aug. 16, 2005

(54) METHOD AND APPARATUS FOR HANDLING REQUESTS FOR CONTENT IN A NETWORK DATA PROCESSING SYSTEM

(75) Inventors: Rajesh Peddu, Austin, TX (US); David Eugene Sanchez, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 09/833,419

(22) Filed: Apr. 12, 2001

(65) Prior Publication Data

US 2002/0152286 A1 Oct. 17, 2002

(51) Int. Cl.$^7$ .............................................. G06F 15/16
(52) U.S. Cl. ..................... 709/203; 709/217; 709/218; 709/219; 709/246; 704/1; 704/2; 704/10; 707/522; 707/513
(58) Field of Search ............................... 709/203, 217, 709/218, 219, 246; 704/1, 2, 10; 707/522, 513

(56) References Cited

U.S. PATENT DOCUMENTS

| | | | | |
|---|---|---|---|---|
| 5,819,092 A | * | 10/1998 | Ferguson et al. ........... 717/113 |
| 5,937,163 A | * | 8/1999 | Lee et al. ................... 709/218 |
| 6,035,330 A | * | 3/2000 | Astiz et al. ................. 709/218 |
| 6,122,661 A | * | 9/2000 | Stedman et al. ............ 709/217 |
| 6,360,254 B1 | * | 3/2002 | Linden et al. .............. 709/219 |
| 6,421,733 B1 | * | 7/2002 | Tso et al. ................... 709/246 |
| 6,654,783 B1 | * | 11/2003 | Hubbard ..................... 709/202 |
| 6,760,694 B2 | * | 7/2004 | Al-Kazily et al. ............. 704/2 |
| 6,799,198 B1 | * | 9/2004 | Huboi et al. ................ 709/203 |
| 2001/0034771 A1 | * | 10/2001 | Hutsch et al. .............. 709/217 |
| 2002/0143821 A1 | * | 10/2002 | Jakubowski ................ 707/522 |

OTHER PUBLICATIONS

"Converting PC GUIs for NonPC Devices", Dan Johnson, Circuit Cellar INK, Feb. 1998, pp. 40–45.*

* cited by examiner

*Primary Examiner*—Ramesh Patel
(74) *Attorney, Agent, or Firm*—Duke W. Yee; David A. Mims, Jr.; Betty Formby

(57) ABSTRACT

A method, apparatus, and computer implemented instructions for handling a request for content in a data processing system. The request for content is received. A content source is identified from a plurality of content sources using the request to form an identified content source. The content is retrieved from the identified content source. A template is applied to the content to generate a web page, wherein the template is a template associated with the identified content source from the plurality of content sources.

28 Claims, 5 Drawing Sheets

METHOD AND APPARATUS FOR HANDLING REQUESTS FOR CONTENT IN A NETWORK DATA PROCESSING SYSTEM

BACKGROUND OF THE INVENTION

1. Technical Field

The present invention relates generally to an improved data processing system, and in particular to a method and apparatus for handling a request for content. Still more particularly, the present invention provides a method, apparatus, and computer implemented instructions for handling a request for content, which may originate from different content providers.

2. Description of Related Art

The Internet, also referred to as an "internetwork", is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files are formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Currently, requests for content are handled by services designed for each particular type of content source. For example, Domino provides integrated application services-such as security, workflow and content management-optimize the platform for rapid delivery of the collaborative Web applications you need to initiate and strengthen key business relationships. Domino is available from International Business Machines Corporation (IBM). Another content source may employ an Internet Information Server (IIS), which is a Web server system available from Microsoft Corporation. Currently, each of these types of content sources require a separate set of processes to process requests and deliver content, such as Web pages. Each service also may provide features, such as electronic mail and security. Many times, a customer may use a different type of content source to serve or provide Web applications. The customer often requires a consistent look and feel regardless of the type of content source. This requirement often involves duplication of common services and infrastructure. When a customer has more than one type of content source, such as a Domino system and a DB2 system, changes made to the look and feel within one content source system require similar changes to be made to other content source system.

Further, often times a customer will have different developers create or modify content. It is often difficult a desired presentation with different developers handling the content creation and modification. Currently, the content has to be reviewed and changes may have to be made to maintain a consistent presentation of content from the content source.

Therefore, it would be advantageous to have an improved method and apparatus for maintaining a desired presentation of content from multiple content sources.

SUMMARY OF THE INVENTION

The present invention provides a method, apparatus, and computer implemented instructions for handling a request for content in a data processing system. The request for content is received. A content source is identified from a plurality of content sources using the request to form an identified content source. The content is retrieved from the identified content source. A template is applied to the content to generate a web page, wherein the template is a template associated with the identified content source from the plurality of content sources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
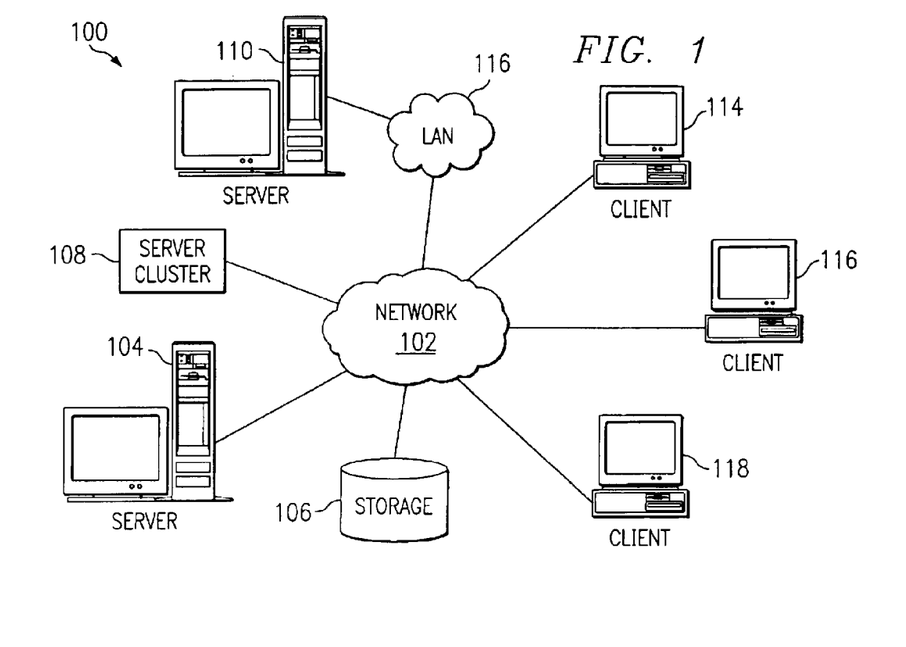
FIG. 1 is a pictorial representation of a network of data processing systems in which the present invention may be implemented.

With reference now to the figures, and in particular FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. Further, network data processing system 100 also includes server cluster 108 as well as a server 110. In this example, server 110 is connected to network 102 through local area network (LAN) 112. In addition, clients 114, 116, and 118 also are connected to network 102. These clients 114, 116, and 118 may be, for example, personal computers or network computers. In the depicted example, server 104, server cluster 108, and server 110 provide a distributed web commerce server system for processing requests from clients 114–118. In the depicted examples, server 104, server cluster 108 and server 110 may be located in multiple, geographically distributed sites. The servers are presented to users, such as those at clients 114–118, as a single Web site. Additionally, one of the servers, such as server 104 may act as a load balancer to receive and direct requests from the clients to the appropriate servers within the system. Network data processing system 100 may include additional servers, clients, and other devices not shown.

In the depicted examples, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
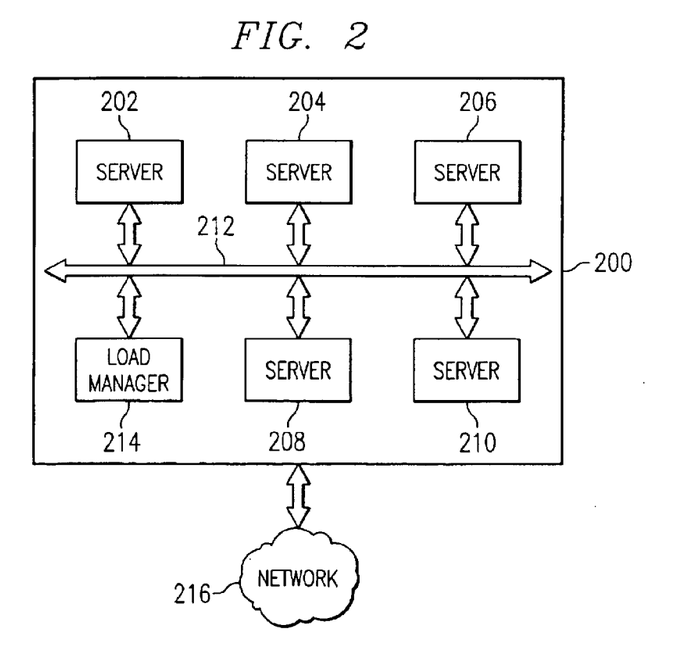
FIG. 2 is a block diagram of a server cluster in accordance with a preferred embodiment of the present invention.

With reference now to FIG. 2, a block diagram of a server cluster is depicted in accordance with a preferred embodiment of the present invention. Server cluster 200 in this example may be implemented as server cluster 108 in FIG. 1.

In this example, servers 202–210 are in communication with each other through communications system 212, which may take various forms. Communications system 212 may be, for example, a bus, a network, or a shared memory.

Communications system 212 is used to handle routing of requests and responses directed towards server farm 200. Load manager 214 also is connected to communications system 212 and serves to receive requests directed to server farm 200 from network 216. Load manager 214 also serves to distribute requests to servers 202–210 for processing.

Figure 3:
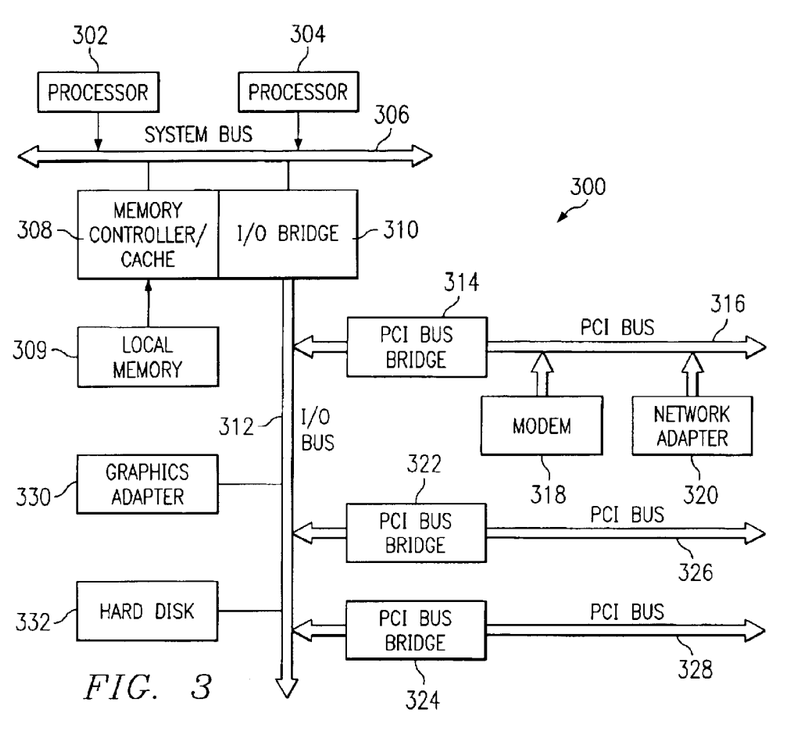
FIG. 3 is a block diagram of a data processing system that may be implemented as a server in accordance with a preferred embodiment of the present invention.

Referring to FIG. 3, a block diagram of a data processing system that may be implemented as a server, such as server 104 in FIG. 1, is depicted in accordance with a preferred embodiment of the present invention. Further, data processing system 300 may be implemented as a server, such as server 202 with server cluster 200, in FIG. 2.

Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted. Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers 114–118 in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

Figure 4:
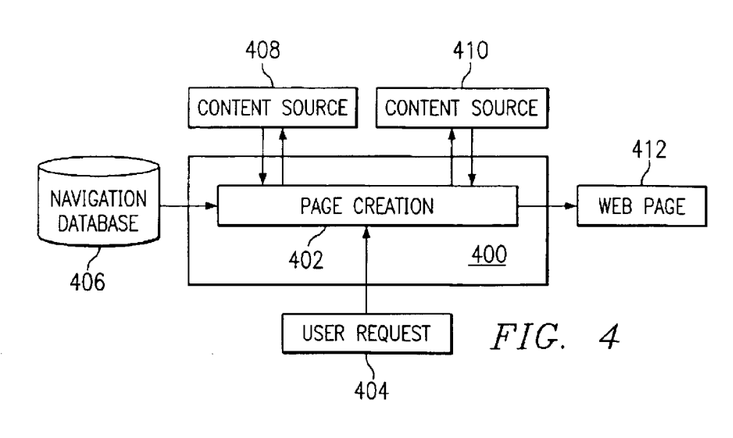
FIG. 4 is a diagram of a content server system in accordance with a preferred embodiment of the present invention.

With reference now to FIG. 4, a diagram of a content server system is depicted in accordance with a preferred embodiment of the present invention. In this example, content server system 400 may be implemented within a server system, such as server farm 200 in FIG. 2 or data processing system 300 in FIG. 3. In these examples, the process, navigation, and display components reside within a Java application server.

In the depicted examples, server system 400 includes page creation process 402, which receives user request 404. As illustrated, user request 404 is passed using the HTTP standard. The mechanism of the present invention may be applied to any content sources supporting this standard.

In response to receiving request 404, page creation 402 will obtain navigation information from navigation database 406 using a universal resource identifier (URI) within the request. Navigation database 406 provides content used to generate links or other mechanisms used to navigate to different Web pages. In these examples, the URI is in the form of a universal resource locator (URL). DataBase 2 (DB2) is an example of a database system, which may be used to implement navigation database 406. DB2 is a relational database management system available from IBM. DB2 is a full-featured SQL language database management system.

Page creation process 402 also will query either content source 408 or content source 410 for content using the URL within user request 404. As illustrated, content source 408 and content 410 provide content for Web pages. In the depicted examples, content source 408 may be a Domino server, while content source 410 may be an IIS server. In response to receiving content and navigation information, Web page 412 is generated and returned to the user.

With this system, a centralized control of page presentation is made possible. Page creation process 402 controls the presentation of content from multiple content sources. In this manner, developers creating content are no longer required to interface with developers generating navigation information. Further, the addition of other content sources, do not require changes to navigation database 406, content source 408, or content source 410. These changes only need to be made to page creation process 402. In this manner, scalability is provided for adding content sources and navigation information, without requiring changes to the different content services.

Figure 5:
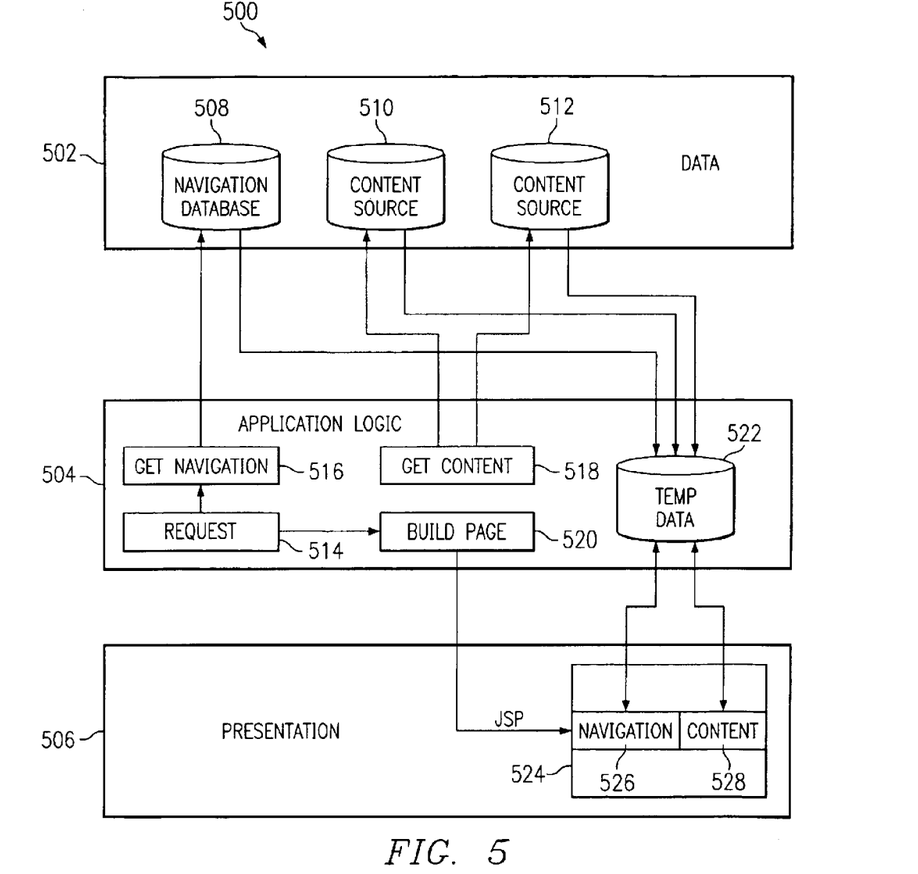
FIG. 5 is a diagram of tiers within a content server system in accordance with a preferred embodiment of the present invention.

Turning next to FIG. 5, a diagram of tiers within a content server system is depicted in accordance with a preferred embodiment of the present invention. In the depicted examples, content server system 500 includes data layer 502, application logic layer 504, and presentation layer 506. Data layer 502 contains information sources, such as navigation database 508, content source 510, and content source 512. Application logic layer 504 includes request process 514, get navigation process 516, get content process 518, and build page process 520, which may be implemented as page creation process 402 in FIG. 4.

Request process 514 serves to receive requests from users, such as a request for a Web page from a browser program. In response to receiving a request, request process 514 identifies a URL sent within the request. This URL is sent to get navigation process 516 and get content process 518. In turn, get navigation process 516 will request navigation data from navigation database 508 using the URL. Get content process 518 will request content from content source 510 or content source 512 using the URL. The requested information is stored in temporary data 522, which may be, for example, a portion of memory or space within a hard disk drive.

Request process 514 also will initiate build page process 520. Build page process 520 will generate a Web page, such as Java server page (JSP) 524 in presentation layer 506. A JSP is an HTML page with embedded Java source code that is executed in the Web server or application server. The HTML provides the page layout that will be returned to the Web browser, and the Java provides the processing, for example, to deliver a query to the database and fill in the blank fields with the results. JSP 524 contains navigation area 526 and content area 528. Navigation information is located in navigation area 526, while content is placed in content area 528. The presentation or look and feel of JSP 524 is controlled by build page process 520.

Figure 6:
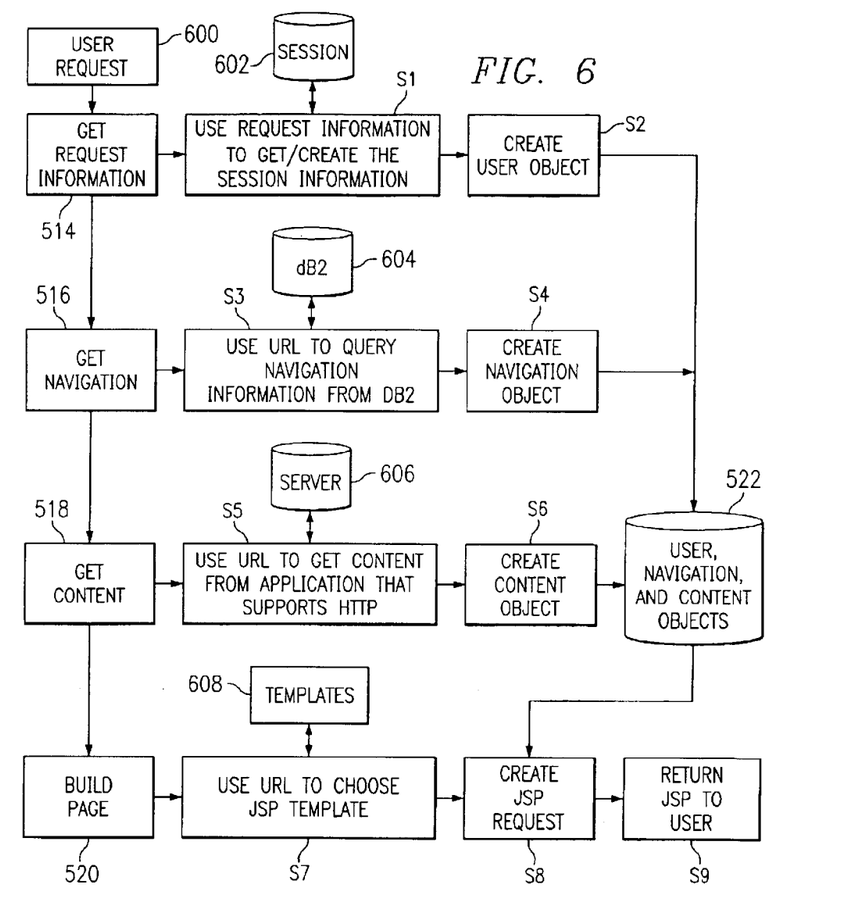
FIG. 6 is diagram of data flow used to generate a Web page in accordance with a preferred embodiment of the present invention.

Turning now to FIG. 6, a diagram of data flow used to generate a Web page is depicted in accordance with a preferred embodiment of the present invention. The data flow in FIG. 6 may be implemented within page creation process 402 in FIG. 4.

The data flow begins by receiving user request 600. Request process 514 uses the request information from user request 600 to get/create session information from session database 602 (block S1). A user object is then created (block S2) and stored within temporary data 522. Get navigation process 516 is initiated to query for navigation information from DB2 604, which contains the navigation information (block S3). This query is made using the URL obtained from user request 600. The navigation object is then created (block S4) and stored with temporary data 522. Get content process 518 uses the URL to obtain content from an application at server 606 supporting HTTP in these examples (block S5). A content object is created (block S6) with this content object being stored in temporary data 522.

Build page process 520 uses the URL to select a JSP template from templates 608 (block S7). This template is selected to provide a presentation of the content for a particular content source. In these examples, the type of presentation for a particular content source is associated with a URL. Further, depending on the particular content retrieved from a particular content source, the presentation may vary for different content from that particular content source.

The particular template selected also may be based on particular preferences of the user originating the request. For example, a user may have a preference to avoid intensive graphic animations. A template may be selected for this user in which these types of animations are absent. These preferences may be associated with a user name received in the request. The preferences may be stored within session database 602 in these examples with the user name being used as a query into the database.

A JSP request is created (block S8). This request uses user, navigation, and content objects stored within temporary data 522 to create a JSP. This JSP is returned to the user originating user request 600 (block S9).

In obtaining content in block S5, the URL is used to identify that particular content source. A number of different mechanisms may be used to identify the correct content source from the URL. For example, domain name system (DNS) information at a DNS server may be altered to direct the request to the appropriate content source. DNS is a name resolution system allowing users to locate computers on a UNIX network or the Internet (TCP/IP network) by domain name. The DNS server maintains a database of domain names (host names) and their corresponding IP addresses.

Figure 7:
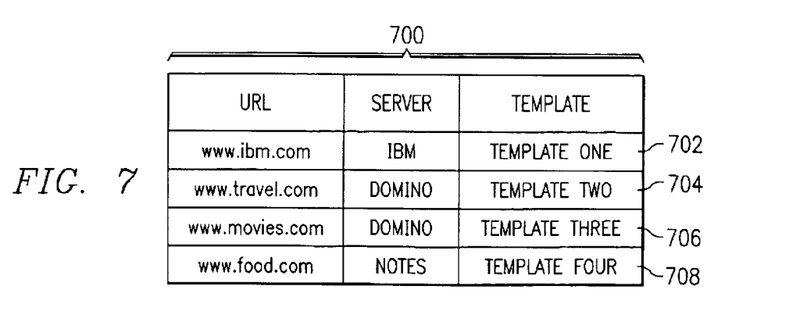
FIG. 7 is a diagram of table used to identify content sources in accordance with a preferred embodiment of the present invention.

Alternatively, the mechanism of the present invention may employ a lookup system. With reference next to FIG. 7, a diagram of table used to identify content sources is depicted in accordance with a preferred embodiment of the present invention. Table 700 includes entries 702–708 in these examples. Each entry includes a URL, a server identification, and a template. When a URL is identified from a request, this URL is used as an index into table 700 to identify the appropriate source. The server identification may take various forms, such as the name of the server, or an IP address for the server. In the depicted examples, table 700 is implemented within application logic layer 504 in FIG. 5. Further, table 700 also may be used to identify a template for a particular content source. In this manner, consistent presentation of content may be applied to content sources from the process of the present invention.

Figure 8:
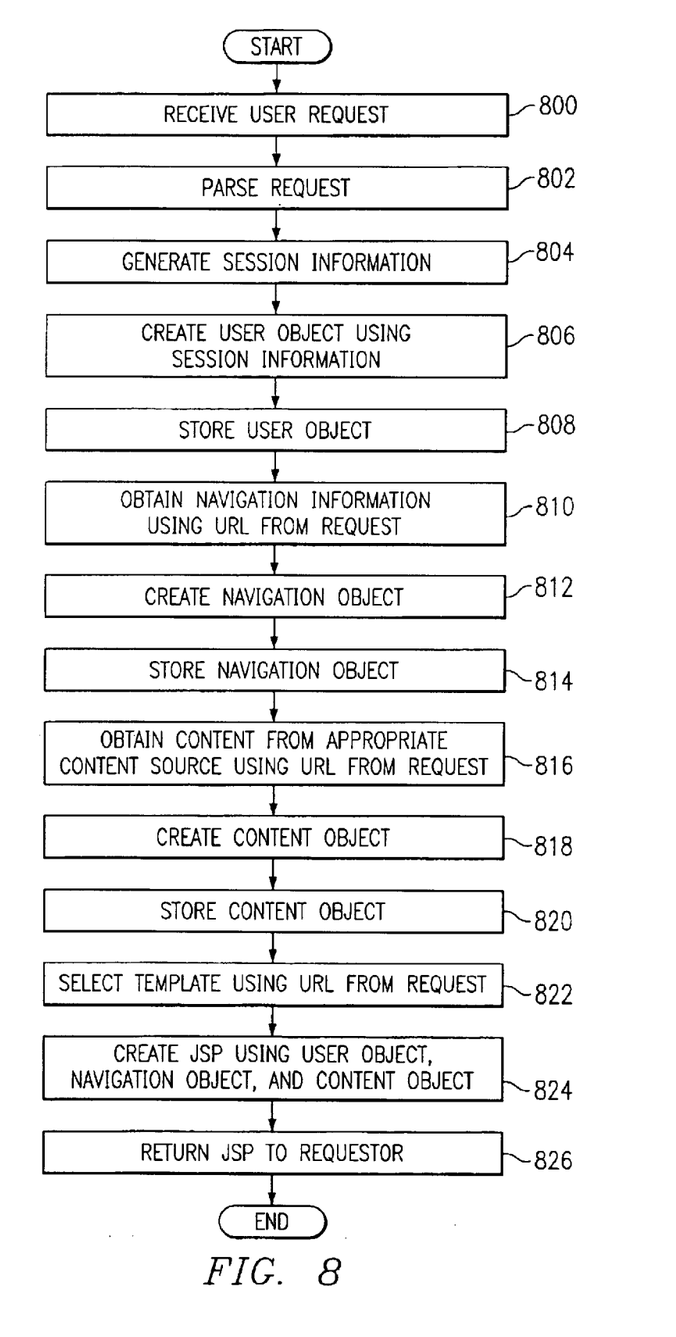
FIG. 8 is a flowchart of a process used for processing a request for content in accordance with a preferred embodiment of the present invention.

Turning next to FIG. 8, a flowchart of a process used for processing a request for content is depicted in accordance with a preferred embodiment of the present invention. The process illustrated in FIG. 8 may be implemented in a process, such as page creation process 402 in FIG. 4.

The process begins by receiving a request from a user (step 800). The request is then parsed (step 802). The request is parsed to obtain information, such as, for example, the URL, the source of the request, destination of the request, a user name, and a user password. Next, session information is generated (step 804). This session may be generated from the information obtained from the request and by querying a database of session information. A user object is created using the session information (step 806). Then, the user object is stored (step 808). In these examples, the user object may be stored in temporary information, such as temporary data 522 in FIG. 5.

Navigation information is obtained using a URL from the request (step 810). The URL may be sent to a navigation database, such as navigation database 508 in FIG. 5. The navigation information identifies other pages to which a user may travel from the page identified by the URL. A navigation object is created (step 812) and then stored (step 814). This object also is stored in a temporary location.

Next, content from an appropriate content source is obtained using the URL from the request (step 816). A content object is created (step 818). Next, the content object is stored (step 820). As with the user object and the navigation object, the content object also is stored in a temporary location.

Then, using the URL from the request, a template is selected (step 822). A particular domain name within the URL for a content source may be used to select the template. In this manner, a presentation of content may be made consistent for a particular content source. A finer granularity may be implemented in which multiple templates may be associated with a particular content source. Different templates may be selected based on particular content identified in the URL. For example, content for sales information may be associated with one template, while content for technical information may be associated with another template. Further, the particular template may be selected based on particular user preferences for the user originating the request.

A JSP is created using the user object, navigation object, and content object (step 824). These objects are in a format that is usable for creating the JSP. The JSP is then returned to the requester (step 826) with the process terminating thereafter.

Using the mechanism of the present invention, a common service is provided for handling requests for content from multiple content sources. Additionally, the mechanism of the present invention allows for filtering the request to package a response, such as a JSP, that incorporates the original content with a consistent presentation. Further, the mechanism of the present invention avoids requiring developers to modify code each time a content provider changes the content or implementation. The presentation of the information is centralized and separated from the content providers through the use of templates or other similar mechanisms to handle presentation of the content. As a result, the need for content developers to interface with presentation functions is avoided. This mechanism provides scalability because of the ability to handle different content sources. Further, the mechanism allows personalization of the presentation of content.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for handling a request for content, the method comprising:

receiving the request for content, which contains a universal resource locator;

identifying a content source from a plurality of content sources using the universal resource locator as an index into a table to form an identified content source;

retrieving the content from the identified content source; and applying a template to the content to generate a Web page, wherein the template is a template associated with the identified content source from the plurality of content sources.

2. The method of claim 1 further comprising:

sending the Web page to a requester originating the request.

3. The method of claim 1, wherein the Web page is a Java server page.

4. The method of claim 1, wherein template is a particular template associated with the identified content source and associated with a user originating the request.

5. A method in a data processing system for handling a request, the method comprising:

receiving the request, wherein the request contains a universal resource identifier;

obtaining navigation information using the universal resource identifier and a navigation database, said navigation information identifying pages to which a user can travel from a page identified by said universal resource identifier;

retrieving content from a particular content source from a plurality of content sources using the universal resource identifier;

selecting a template from a plurality of templates using the universal resource identifier, wherein the template is a template associated with the particular content source from the plurality of content sources; and generating a Web page using the template, the navigation information, and content.

6. The method of claim 5 further comprising:
generating session information using information within the request.

7. The method of claim 5, wherein selecting step includes selecting the template using the session information in addition to the universal resource identifier.

8. The method of claim 5, wherein the obtaining step comprises:
obtaining navigation information using the universal resource identifier; and
creating a navigation object.

9. The method of claim 8, wherein the retrieving step comprises:
retrieving content from a particular content source from a plurality of content sources using the universal resource identifier; and
creating a content object.

10. The method of claim 9, wherein the generating step comprises:
generating the Web page using the template, the navigation object, and content object.

11. The method of claim 5, wherein the Web page is a Java server page.

12. A content server system for providing content to a user, the content server system comprising:
an identification process, wherein the identification process obtains content source information using a universal resource locator as an index to a table;
a get content process, wherein the get content process obtains content from a plurality of content sources using the content source information;
a build page process, wherein a page is created using the content and a template, wherein the template is a template associated with the content source information; and
a request process, wherein the request process initiates the identification process, the get content process, and the build page process in response to receiving a request.

13. The content server system of claim 12, wherein the build page process is initiated after the navigation information and the content are retrieved.

14. A data processing system comprising:
a bus system;
a communications unit connected to the bus system;
a memory connected to the bus system, wherein the memory includes as set of instructions; and
a processing unit connected to the bus system, wherein the processing unit executes the set of instructions to:
receive the request for content, the request containing a universal resource locator,
identify a content source from a plurality of content sources using the universal resource locator as an index to a table to form an identified content source,
retrieve the content from the identified content source, and
apply a template to the content to generate a Web page, wherein the template is a template associated with the identified content source from the plurality of content sources.

15. A data processing system comprising:
a bus system;
a communications unit connected to the bus system;
a memory connected to the bus system, wherein the memory includes as set of instructions; and
a processing unit connected to the bus system, wherein the processing unit executes the set of instructions to
receive the request, wherein the request contains a universal resource identifier,
obtain navigation information using the universal resource identifier and a navigation database, the navigation information indicating pages to which a user can travel from a page identified by the universal resource indicator,
retrieve content from a particular content source from a plurality of content sources using the content source information,
select a template from a plurality of templates using the universal resource identifier, wherein the template is a template associated with the particular content source from the plurality of content sources, and
generate a Web page using the template, the content source information, and content.

16. A data processing system for handling a request for content, the data processing system comprising:
receiving means for receiving the request for content, the request containing a universal resource locator;
identifying means for identifying a content source from a plurality of content sources using the universal resource locator to form an identified content source;
retrieving means for retrieving the content from the identified content source; and
applying means for applying a template to the content to generate a Web page, wherein the template is a template associated with the identified content source from the plurality of content sources.

17. The data processing system of claim 16 further comprising:
sending means for sending the Web page to a requester originating the request.

18. The data processing system of claim 16, wherein the Web page is a Java server page.

19. The data processing system of claim 16, wherein template is a particular template associated with the identified content source and associated with a user originating the request.

20. A data processing system for handling a request, the data processing system comprising:
receiving means for receiving the request, wherein the request contains a universal resource identifier;
obtaining means for obtaining navigation information using the universal resource identifier and a navigation database, the navigation information indicating pages to which a user can travel from a page pointed to by the universal resource identifier;
retrieving means for retrieving content from a particular content source from a plurality of content sources using the universal resource identifier;
selecting means for selecting a template from a plurality of templates using the universal resource identifier, wherein the template is a template associated with the particular content source from the plurality of content sources; and
generating means for generating a Web page using the template, the navigation information, and content.

21. The data processing system of claim 20, wherein the generating means is a first generating means and further comprising:
second generating means for generating session information using information within the request.

22. The data processing system of claim 20, wherein selecting means includes means for selecting the template using the session information in addition to the universal resource identifier.

23. The data processing system of claim 20, wherein the obtaining means comprises:
first means for obtaining navigation information using the universal resource identifier; and
second means for creating a navigation object.

24. The data processing system of claim 23, wherein the retrieving means comprises:
first means for retrieving content from a particular content source from a plurality of content sources using the universal resource identifier; and
second means for creating a content object.

25. The data processing system of claim 24, wherein the generating means comprises:
first means for generating the Web page using the template, the navigation object, and content object.

26. The data processing system of claim 20, wherein the Web page is a Java server page.

27. A computer program product in a computer readable medium for handling a request for content, the computer program product comprising:
first instructions for receiving the request for content, the request containing a universal resource locator;
second instructions for identifying a content source from a plurality of content sources using the universal resource locator to form an identified content source;
third instructions for retrieving the content from the identified content source; and
fourth instructions for applying a template to the content to generate a Web page, wherein the template is a template associated with the identified content source from the plurality of content sources.

28. A computer program product in a computer readable medium for handling a request, the computer program product comprising:
first instructions for receiving the request, wherein the request contains a universal resource identifier;
second instructions for obtaining navigation information using the universal resource identifier and a navigation database, the navigation information identifying pages to which a user can travel from the page identified by the universal resource locator;
third instructions for retrieving content from a particular content source from a plurality of content sources using the universal resource identifier;
fourth instructions for selecting a template from a plurality of templates using the universal resource identifier, wherein the template is a template associated with the particular content source from the plurality of content sources; and
fifth instructions for generating a Web page using the template, the navigation information, and content.

* * * * *